235-382 SR

10/22/85 OR 4,549,076

United States Patent [19]

Flies

[11] Patent Number: 4,549,076

[45] Date of Patent: Oct. 22, 1985

[54] ORIENTATION GUIDE ARRANGEMENT FOR ELECTRONIC KEY AND RECEPTACLE COMBINATION

[75] Inventor: William P. Flies, Burnsville, Minn.

[73] Assignee: Datakey, Inc., Minneapolis, Minn.

[21] Appl. No.: 478,221

[22] Filed: Mar. 24, 1983

[51] Int. Cl.[4] .............................................. G06K 5/00

[52] U.S. Cl. ..................................... 235/382; 70/454; 200/43.09; 200/51.12; 200/51.13; 235/483; 235/492; 339/65

[58] Field of Search ............... 235/382, 483, 485, 492; 70/454; 339/65, 66 M; 200/44, 51.12, 51.13

[56] References Cited

U.S. PATENT DOCUMENTS

| | | | |
|---|---|---|---|
| 3,001,167 | 9/1961 | Chesnutt et al. | 200/51.13 X |
| 3,500,326 | 3/1970 | Benford . | |
| 3,660,831 | 5/1972 | Nicola et al. . | |
| 3,754,214 | 8/1973 | Matsumoto et al. . | |
| 3,761,892 | 9/1973 | Bosnyak et al. . | |
| 3,848,229 | 11/1974 | Perron et al. . | |
| 3,859,634 | 1/1975 | Perron et al. . | |
| 3,889,501 | 6/1975 | Fort . | |
| 4,023,161 | 5/1977 | Sasaki . | |
| 4,297,569 | 10/1981 | Flies . | |
| 4,326,125 | 4/1982 | Flies . | |
| 4,333,328 | 6/1982 | Platt | 200/44 X |

FOREIGN PATENT DOCUMENTS

| | | |
|---|---|---|
| 2146802 | 3/1973 | France . |
| 2073808A | 10/1981 | United Kingdom . |

*Primary Examiner*—David L. Trafton
*Attorney, Agent, or Firm*—Vidas & Arrett, P.A.

[57] ABSTRACT

Guide arrangement for assuring predetermined orientation for electronic key relative to an electrical receptacle into which it is to be inserted.

6 Claims, 5 Drawing Figures

ORIENTATION GUIDE ARRANGEMENT FOR ELECTRONIC KEY AND RECEPTACLE COMBINATION

BACKGROUND OF THE INVENTION

This invention relates to improvements to the functional design of electronic keys and electrical receptacles for receiving same. The invention is an improvement in the inventions of U.S. Pat. No. 4,297,569, issued Oct. 27, 1981, entitled "Microelectronic Memory Key With Receptacle and Systems Therefor," U.S. Pat. No. 4,326,125, issued Apr. 20, 1982, entitled "Improved Microelectronic Memory Key with Receptacle and Systems Therefor," U.S. Pat. No. 4,379,966, issued Apr. 12, 1983, entitled "Receptacle for Electronic Information Key;" U.S. Pat. No. 4,436,993, issued Mar. 13, 1984, entitled "Improved Electronic Key," and pending U.S. patent application Ser. No. 343,112, filed Jan. 27, 1982, entitled "Lock Mechanism for Electronic Information Key" (now abandoned). The disclosures of these patents and applications are incorporated herein by reference.

The electronic systems disclosed in these patents include a master circuit or electrical operating system of some kind, such as a computer system, which is activated by use of an electronic key inserted into a suitable receptacle to make electrical contact or connection with the master system. This invention is concerned broadly with such electronic keys and electrical receptacles therefor.

BRIEF SUMMARY OF THE INVENTION

It is sometimes desirable to design the aforementioned electronic keys in such a way that they must be oriented in a predetermined position in order to be inserted into the receptacle. Consequently, the user must hold the key in such a predetermined position in order to successfully insert it into the receptacle. It is the purpose of this invention to provide a registration arrangement which assures appropriate orientation of the key, allowing it to be fully inserted into the electrical receptacle.

The registration means of the invention includes, in one embodiment, arcuate guide means concentrically arranged about the receptacle keyway opening and guide follower means carried by the head of the electronic key so as to register with the arcuate guide means when the key is properly oriented and allow full insertion of the key into the receptacle and rotation thereof. In another embodiment, the registration means includes a rib on the key and a corresponding groove in the receptacle.

DETAILED DESCRIPTION OF THE INVENTION

Figure 1:
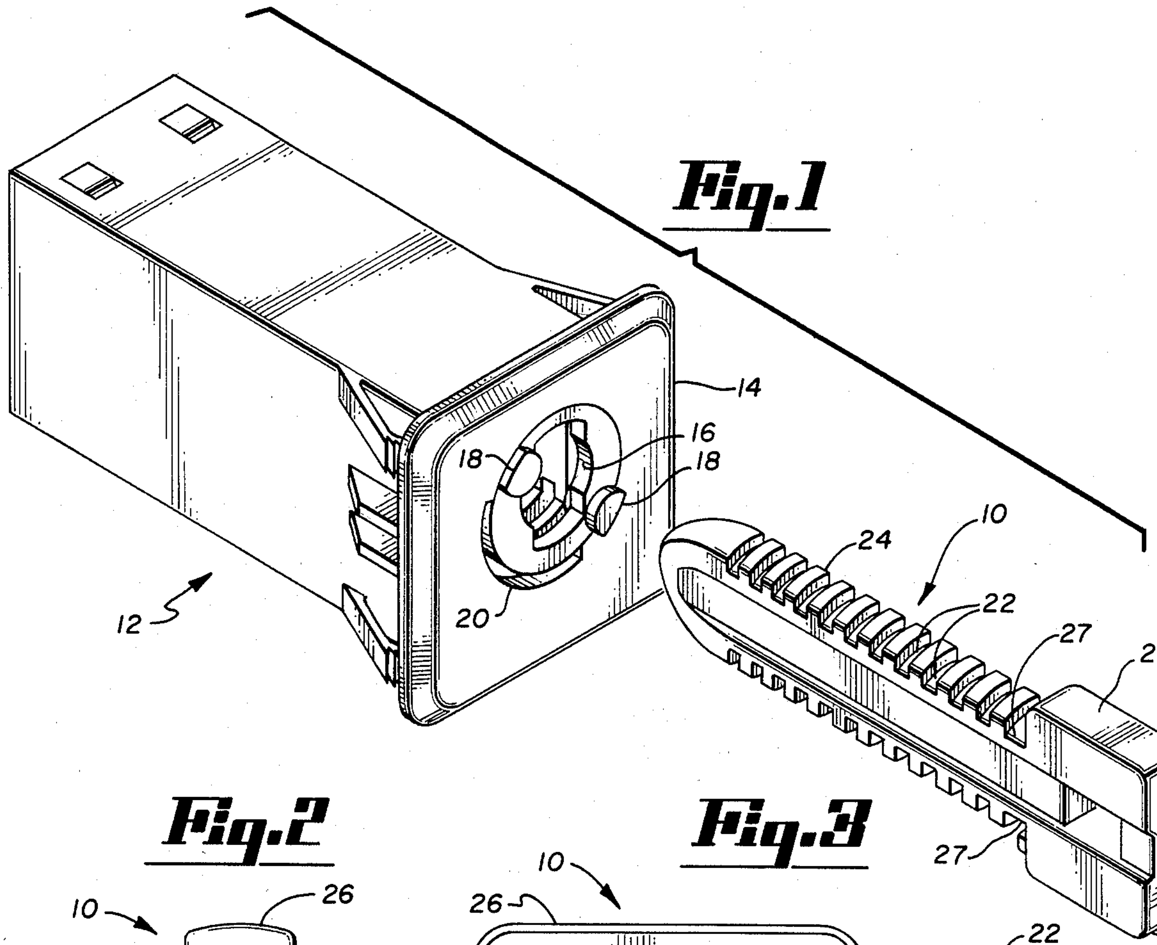
FIG. 1 is a pictorial drawing showing a properly oriented electronic key of one embodiment of the invention being inserted into an electrical receptacle.
Figure 2:
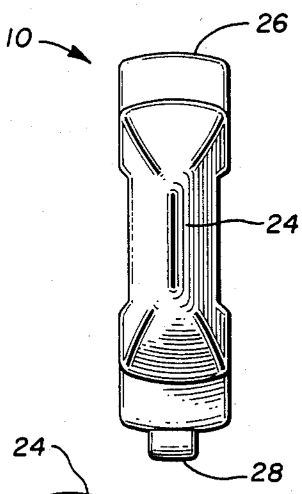
FIG. 2 is a left end elevation of the electronic key as shown in FIG. 1.
Figure 3:
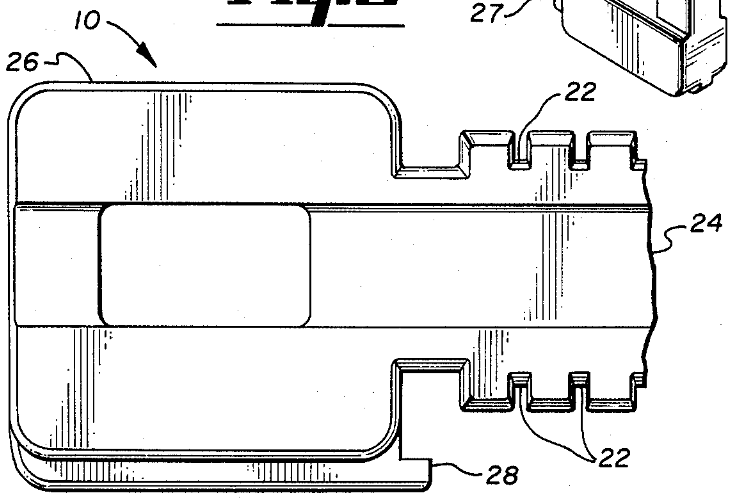
FIG. 3 is an elevational view of the head and a shank portion of the key shown in FIG. 1.

Referring now to the drawings, in FIG. 1 there is shown an electronic key generally designated 10. Key 10 is positioned for insertion into an electrical receptacle, generally designated 12. Receptacle 12 includes a face plate 14 having a keyway opening 16 therein for receiving key 10. Face plate 14 may include suitably positioned stop means 18 as shown, which control the angular rotation of key 10 when inserted in the receptacle to limit rotation. Face plate 14 also carries arcuate groove 20 which is concentric with keyway opening 16. Groove 20 functions as an arcuate guide means on face plate 14 for key 10.

Electronic key 10 carries a plurality of spaced electrical contacts 22 in grooves on its shank portion 24. The head portion 26 of key 10 includes a peg-like projection 28 which functions as a guide follower means in combination with groove 20 to assure proper predetermined orientation of the key relative to the keyway opening 16 and receptacle 12 for full insertion through opening 16 into the receptacle. Opening 16 is preferably a compound shape comprising a generally rectangular slot which permits insertion of the key shank 24 into receptacle 12 in a generally circular central expansion area, the diameter of which corresponds generally to the thickness of the key between the oppositely disposed grooves 27 located adjacent head portion 26 of key 10. The shape of keyway opening 16 cooperates with grooves 27 so that the key may not be rotated until it is fully inserted into the receptacle. Additionally, once rotation has begun, the key may not be removed until it is returned to the predetermined insertion position. If key 10 is not oriented so as to assure engagement of projection 28 with groove 20, the key will not be completely inserted into keyway 16, and its rotation in the receptacle will be prevented. When the key is oriented in the predetermined fashion, as shown in FIG. 1, projection 28 will engage groove 20, allowing full insertion of key 10 into receptacle 12 and its rotation therein.

In accordance with the above description, it can be seen that this invention provides, in its broadest sense, registration means operative between electronic key 10 and receptacle face plate 14 for assuring predetermined orientation of the key relative to keyway opening 16. The registration means includes arcuate guide means on the face plate concentric with the keyway opening and guide follower means carried by head 26 of key 10. In the broadest sense of the invention, the design and arrangement of the arcuate guide means and the guide follower means may assume various configurations, it only being necessary that they cooperate to provide the registration function described herein.

Figure 4:
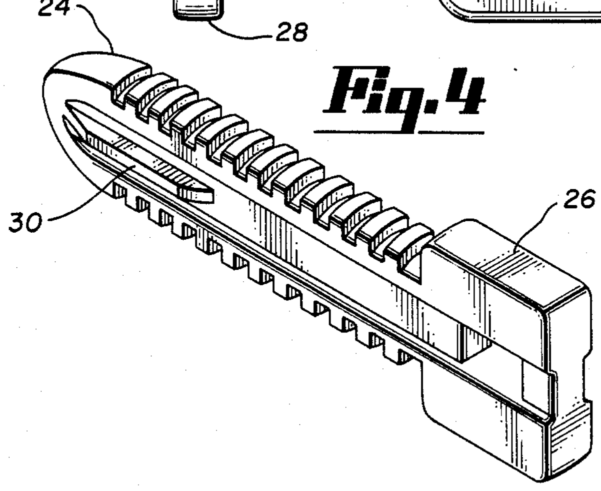
FIG. 4 is a pictorial drawing of the second embodiment of the invention showing a rib on the key.
Figure 5:
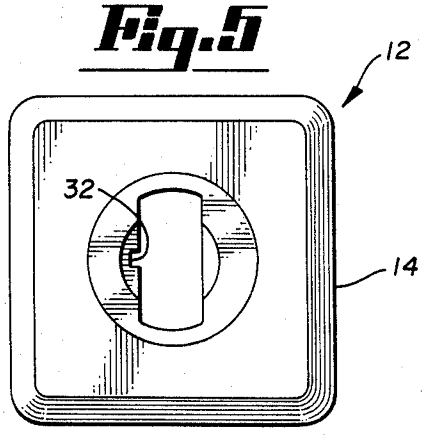
FIG. 5 is an elevational view of a grooved receptacle for receiving the key of FIG. 4.

Referring now to FIGS. 4 and 5, another embodiment of the registration means of the invention is disclosed. In this embodiment, key 10 carries on its shank portion 24 a raised rib 30 as shown in FIG. 4. As shown in FIG. 5, face plate 14 of the receptacle 12 includes at the entrance to the keyway a corresponding groove 32. As is apparent, key 10 must be oriented so as to mate rib 30 and groove 32 to allow insertion into the receptacle. Stop 18, shown in FIG. 1, may be included in this embodiment also, if desired.

It is to be understood that, within the scope of the following claims, the invention may be practiced otherwise than as specifically described.

What is claimed is:

1. In the combination of an electrical receptacle having a face plate with an opening leading to a keyway and an electronic key, including a head portion, adapted for insertion into the receptacle keyway and rotation therein, the improvement comprising:

registration means operative between the key and receptacle face plate for assuring a predetermined orientation of the key relative to the keyway upon insertion, the registration means including arcuate guide means on the face plate, the guide means being concentric with the keyway opening, and guide follower means carried by the head of the key, the guide follower means being disposed on the head and projecting therefrom so as to register with the arcuate guide means allowing full insertion of the key into the receptacle when the key is oriented in a predetermined manner relative to the keyway and guiding the key during rotation.

2. The improvement of claim 1 in which the guide follower means is carried by the forward edge of the key head and projects forwardly from it.

3. The improvement of claim 1 in which the arcuate guide means comprises a groove.

4. The improvement of claim 3 in which the arcuate groove means extends over a radial space of 90° on the face plate.

5. The improvement of claim 3 in which the guide follower means comprises a projection of peg-like shape.

6. In the combination of an electrical receptacle having a face plate with an opening leading to a keyway and an electronic key, including a head portion and shank portion, the key being adapted for insertion into the receptacle keyway and rotation therein, the improvement comprising:

registration means operative between the key and receptacle face plate for assuring a predetermined orientation of the key relative to the keyway upon insertion, the registration means including arcuate guide means in the form of a groove on the face plate, the guide means being concentric with the keyway opening and a peg-like guide follower means carried by the head of the key and projecting therefrom substantially parallel to the key shank, the projecting guide follower means being disposed on the head so as to register within the grooved arcuate guide means allowing full insertion of the key into the receptacle when the key is oriented in a predetermined manner relative to the keyway and guiding the key during rotation.

* * * * *